Sept. 6, 1932.  J. A. AITON  1,875,404
SYSTEM FOR CONNECTING BRANCH TUBES TO PRESSURE VESSELS OR PIPES Filed Aug. 6, 1931

J. A. Aiton
INVENTOR

By Marks & Clerk
ATT'YS.

Patented Sept. 6, 1932

1,875,404

UNITED STATES PATENT OFFICE

JOHN ARTHUR AITON, OF DERBY, ENGLAND, ASSIGNOR TO AITON & COMPANY LIMITED, OF DERBY, ENGLAND

SYSTEM FOR CONNECTING BRANCH TUBES TO PRESSURE VESSELS OR PIPES

Application filed August 6, 1931, Serial No. 555,608, and in Great Britain January 16, 1931.

This invention relates to a system for connecting branch tubes to pressure vessels or pipes and more particularly to the fixing of branch pipes into steam receivers.

With the big increase in steam pressures employed at the present day, steam receivers which in most instances are manufactured from weldless or seamless forgings or tubes, have to be of a very substantial thickness.

Owing to this thickness, difficulties arise in attaching branch pipes to such receivers and the usual methods where a flanged branch or boss is provided have not proved altogether satisfactory.

The object of the present invention is to provide an improved system of jointing more especially adapted for attaching branch pipes to pressure vessels such as steam receivers, by which the above mentioned difficulties are overcome.

The invention consists in a system for connecting branch pipes to pressure vessels or pipes, more especially adapted for attaching branch pipes to high pressure vessels such as steam receivers or high pressure steam pipes, in which the said vessel or pipe is bored or otherwise formed to receive a branch pipe which is then screwed into, or otherwise fastened to, a nut held within the vessel or pipe, the branch pipe and nut being thereafter welded to the vessel or pipe at respectively the exterior junction and adjacent to the interior junction therewith.

Referring now to the accompanying drawing which illustrates by way of example a pipe joint constructed in accordance with the invention as applied to a steam receiver.

Figure 1:
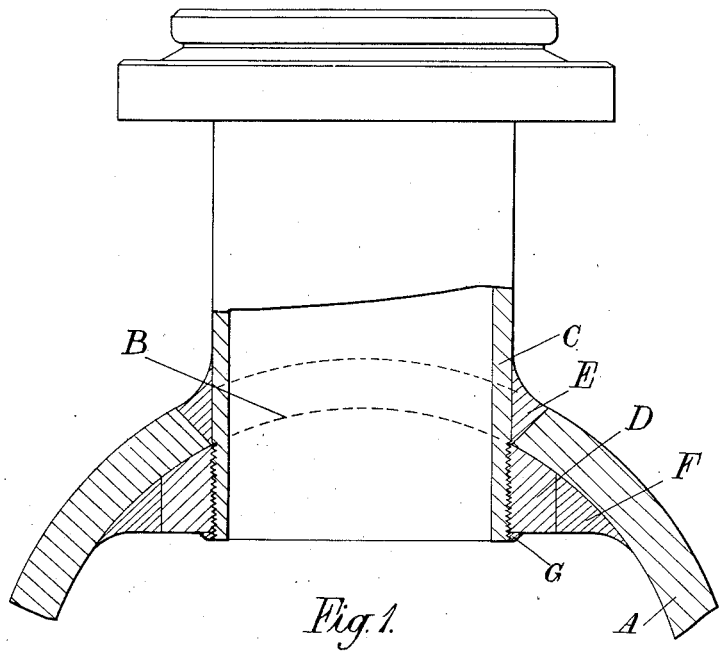
Figure 1 represents a completed joint in section.
Figure 2:
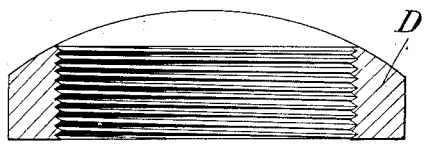
Figure 2 represents the internally screwthreaded nut in section.

In Figure 1, A represents in section a portion of a steam receiver in which a hole B is bored or otherwise formed, the hole being of the same diameter as that of the external diameter of the branch pipe C which is to be secured thereto.

An internally screwthreaded nut is positioned within the receiver A, the inner face of which nut is cylindrical to fit the interior cylindrical surface of the receiver and the end of the branch pipe C is screwed or otherwise secured into the said nut.

The branch pipe C with the nut D screwed thereon is then held against the interior of the body of the receiver A, for example, either by hydraulic or pneumatic power and while held in this position the weld E is made at the exterior junction of the branch pipe C with the receiver A, and for which purpose, the hole B is flared or countersunk.

When this weld has been completed the nut D is welded to the receiver A adjacent to the interior junction therewith at F, the whole joint being thus completed.

If desired a further weld may be made at G at the junction of the nut D with the interior extremity of the branch pipe C.

It will be observed that since the nut D is welded solid to the body of the receiver A, the latter is thus actually reinforced against the otherwise weakening effect of the hole B cut or formed in the receiver.

High pressures necessitate the employment of material having a low stress, and cutting holes in such material usually necessitates providing an extra thickness of material where the hole is to be made, thus adding considerably to the weight. A joint constructed according to the present invention avoids this objection since the nut D, although it acts as a reinforcement, does not appreciably add to the weight of the joint.

While the invention has been described in the foregoing description in its application to the securing of a branch pipe to a steam receiver, it will be understood that the improved system of joint may be equally well applied to other purposes where heavy pressures are likely to be encountered and where the material is to be of a minimum thickness capable of withstanding such pressures.

Instead of employing the nut D, the receiver or pipe may be formed with a thickened internal portion which is bored and threaded to receive the threaded end of a branch pipe, a portion of the bore being flared or countersunk so that when the branch pipe is secured in position the joint is completed by welding the flared part of the bore around the branch pipe.

If desired, the screwed end of the branch pipe projecting within the receiver or pipe may be welded to the thickened internal portion of the receiver or pipe.

Having now described my invention, what I claim as new and desire to secure by Letters Patent is:—

1. In combination a vessel adapted to withstand pressure, a branch pipe therefrom, the said branch pipe being screwed into a nut within the said vessel, a weld at the junction of the branch pipe with the exterior of the vessel and a weld at the junction of the nut with the interior of the vessel.

2. In combination a vessel adapted to withstand pressure, a branch pipe therefrom, the said branch pipe being screwed into a nut within the said vessel, a weld at the junction of the branch pipe with the exterior of the vessel, a weld at the junction of the nut with the interior of the vessel and a weld at the extremity of the branch pipe within the vessel at the junction of the said branch pipe with the nut.

In testimony whereof I have signed my name to this specification.

JOHN ARTHUR AITON.